United States Patent
Ki et al.

(10) Patent No.: US 11,661,020 B2
(45) Date of Patent: May 30, 2023

(54) VEHICLE BATTERY MOUNT STRUCTURE

(71) Applicant: Hyundai Mobis Co., Ltd., Seoul (KR)

(72) Inventors: Won Yong Ki, Seoul (KR); Ki Hyun Kim, Hwaseong-si (KR); Wook Han Choi, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 244 days.

(21) Appl. No.: 17/126,184

(22) Filed: Dec. 18, 2020

(65) Prior Publication Data
US 2021/0387583 A1 Dec. 16, 2021

(30) Foreign Application Priority Data

Jun. 15, 2020 (KR) .................. 10-2020-0072524

(51) Int. Cl.
*B60R 16/00* (2006.01)
*B60R 16/04* (2006.01)

(52) U.S. Cl.
CPC .................... *B60R 16/04* (2013.01)

(58) Field of Classification Search
CPC .................. B60R 16/04; B60K 1/04
See application file for complete search history.

(56) References Cited

U.S. PATENT DOCUMENTS

| | | | | |
|---|---|---|---|---|
| 8,939,246 B2 * | 1/2015 | Yamaguchi | ............ | B60L 50/66 180/311 |
| 9,045,030 B2 * | 6/2015 | Rawlinson | ............ | B60L 50/66 |
| 9,227,582 B2 * | 1/2016 | Katayama | ............ | B60R 16/04 |
| 10,112,470 B2 * | 10/2018 | Hamilton | ............ | B62D 25/20 |
| 10,336,211 B2 * | 7/2019 | Kobayashi | ........... | H01M 50/271 |
| 10,661,841 B2 * | 5/2020 | Choi | ........... | B60K 1/04 |
| 10,730,380 B2 * | 8/2020 | Tatsuwaki | ............ | B60L 3/0007 |
| 10,882,557 B2 * | 1/2021 | Otoguro | .............. | B60K 1/04 |
| 2006/0272877 A1 * | 12/2006 | Nozaki | ............... | B60K 1/04 180/291 |
| 2014/0291046 A1 * | 10/2014 | Araki | .................. | B62D 25/20 180/68.5 |
| 2016/0375750 A1 * | 12/2016 | Hokazono | ......... | B62D 25/2036 180/68.5 |
| 2018/0194212 A1 * | 7/2018 | Hamilton | ............. | B60N 2/015 |
| 2019/0245171 A1 | 8/2019 | Jin et al. | | |
| 2020/0031399 A1 * | 1/2020 | Matsuda | ............ | B62D 25/2036 |

FOREIGN PATENT DOCUMENTS

| | | |
|---|---|---|
| JP | 2017-196958 | 11/2017 |
| KR | 10-1209935 | 12/2012 |
| KR | 10-1998565 | 7/2019 |
| KR | 10-2171344 | 10/2020 |

* cited by examiner

*Primary Examiner* — Hau V Phan
(74) *Attorney, Agent, or Firm* — H.C. Park & Associates, PLC

(57) ABSTRACT

A vehicle battery mount structure includes: a battery module fixed to a vehicle body; a through pipe disposed in the battery module; a fixing member configured to fix a lower case and an upper case of the battery module; and a through bolt configured to fix the battery module to a vehicle body bottom frame. The through bolt passes through the through pipe and the fixing member and is coupled to the fixing member.

8 Claims, 9 Drawing Sheets

100: 110, 120, 130

100: 110, 120, 130

100: 110, 120, 130

VEHICLE BATTERY MOUNT STRUCTURE

CROSS-REFERENCE TO RELATED APPLICATION

This application claims priority from and the benefit of Korean Patent Application No. 10-2020-0072524, filed on Jun. 15, 2020, which is hereby incorporated by reference for all purposes as if set forth herein.

BACKGROUND

Field

Exemplary embodiments relate to a vehicle battery mount structure, and more particularly to, a vehicle battery mount structure improving space utilization in a battery pack and fixing of a vehicle battery to a vehicle body.

Discussion of the Background

Vehicles need electric energy supply sources for supplying electric energy to start engines or operate electronic devices of the vehicles.

A vehicle battery is an electricity supply source for supplying electric energy so as to operate electronic devices of the vehicle when the engine is started and is generally disposed on a lower surface of a bottom frame or disposed in engine room of a vehicle body.

Such a vehicle battery includes fixing holes in a side surface and a central portion thereof for structural stability and is fixed to the vehicle body by using separate coupling parts.

In addition, the coupling part has a structure in which bolt holes are formed in upper and lower portions of a case, and bolts are inserted into and coupled to the bolt holes.

For example, the coupling part conventionally has the structure in which a separate bolt is coupled to a nut, or a separate member fixed in the case is coupled to the upper portion thereof.

Meanwhile, the conventional battery mount structure has a problem that there is difficulty in applying the conventional battery mount structure when an inner space of a battery pack is small.

Specifically, when the inner space of the battery pack is insufficient, an energy density is low, and thus a commercial value may be lowered, and in the case that a mounting part is applied to an upper space of a battery module, a height of the battery module is increased, and thus there is a problem that utilization of a space of the vehicle body is lowered.

In addition, in the case that a separate member is applied to an interior of a battery case, since a coupling part for coupling the member and a lower case requires a separate part, additional parts including three or more kinds of hardware and three or more kinds of separate brackets are required.

However, in the case of a structure in which only bolts are used without separate parts due to the above-described problems, connectivity between an upper case and a lower case insufficient, and thus there is a problem in that a function to fix a battery module may not be performed.

The above information disclosed in this Background section is only for enhancement of understanding of the background of the invention and, therefore, it may contain information that does not constitute prior art.

SUMMARY

Applicant realized that a conventional battery mount structure has a problem that there is difficulty in applying the conventional battery mount structure when an inner space of a battery pack is small.

Vehicle battery mount structures constructed according to the principles and exemplary implementations of the invention is capable of improving space utilization of an upper space of a battery module, reducing the number of parts of the vehicle battery mount structures, and increasing a fixing force of the battery module fixed to a vehicle body.

Additional features of the invention will be set forth in the description which follows, and in part will be apparent from the description, or may be learned by practice of the invention.

According to an aspect of the invention, a vehicle battery mount structure includes a battery module fixed to a vehicle body, a through pipe disposed in the battery module, a fixing member configured to fix a lower case and an upper case of the battery module, and a through bolt configured to fix the battery module to a vehicle body bottom frame, wherein the through bolt passes through the through pipe and the fixing member and is coupled to the fixing member.

The battery module may include a plurality of battery cells configured to store power to be supplied to a battery system, a lower case supporting the battery cell and including a first fixing hole, through which the fixing member passes, and an upper case coupled to an upper portion of the lower case and including a second fixing hole, through which the fixing member passes, is formed.

The fixing member may include a lower support member passing through the first fixing hole and disposed on a lower surface of the lower case, and an upper assembly bolt passing through the second fixing hole and disposed on an upper surface of the upper case.

The lower case may be integrally formed with the through pipe and the lower support member.

The through pipe may include a first through portion including an upper surface contacting a lower surface of the upper case, the first through portion coupled to the upper assembly bolt in a screw-coupling method, and a second through portion disposed below the first through portion, wherein the through bolt passes through the second through portion.

An inner diameter of the upper assembly bolt may be substantially equal to an inner diameter of the second through portion.

An inner diameter of the first through portion may be greater than an inner diameter of the second through portion.

The lower support member may include a bottom portion including an upper surface contacting a lower surface of the second through portion, a vertical portion vertically extending along a circumference of the bottom portion, and a first flange part horizontally extending from an end portion of the vertical portion and including an upper surface disposed on a lower surface of the lower case.

The upper assembly bolt may include a second flange part including a lower surface disposed on an upper surface of the upper case, and a coupling part including an outer circumferential surface coupled to the first through portion of the through pipe in a screw-coupling method and an inner circumferential surface along which the through bolt passes through.

The through bolt may include a third flange part including an upper surface disposed on the bottom portion of the lower support member, and a screw part extending in a direction from the third flange part toward the coupling part and coupled to the coupling part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
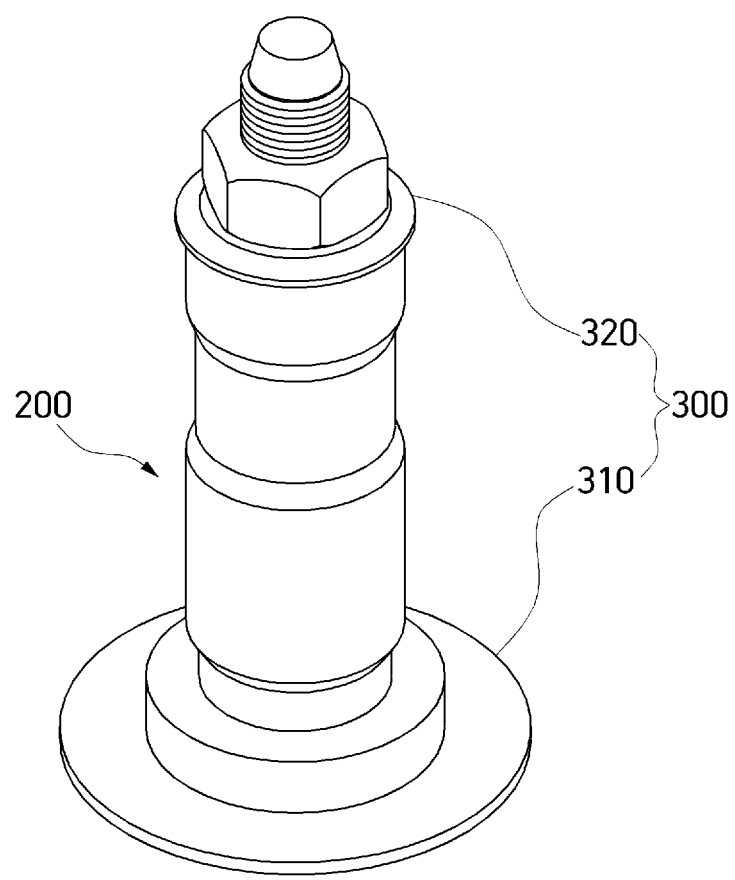
FIG. 1 is a perspective view of a configuration of an exemplary embodiment of a vehicle battery mount structure constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments will be described in detail with reference to accompanying drawings.

Figure 2:
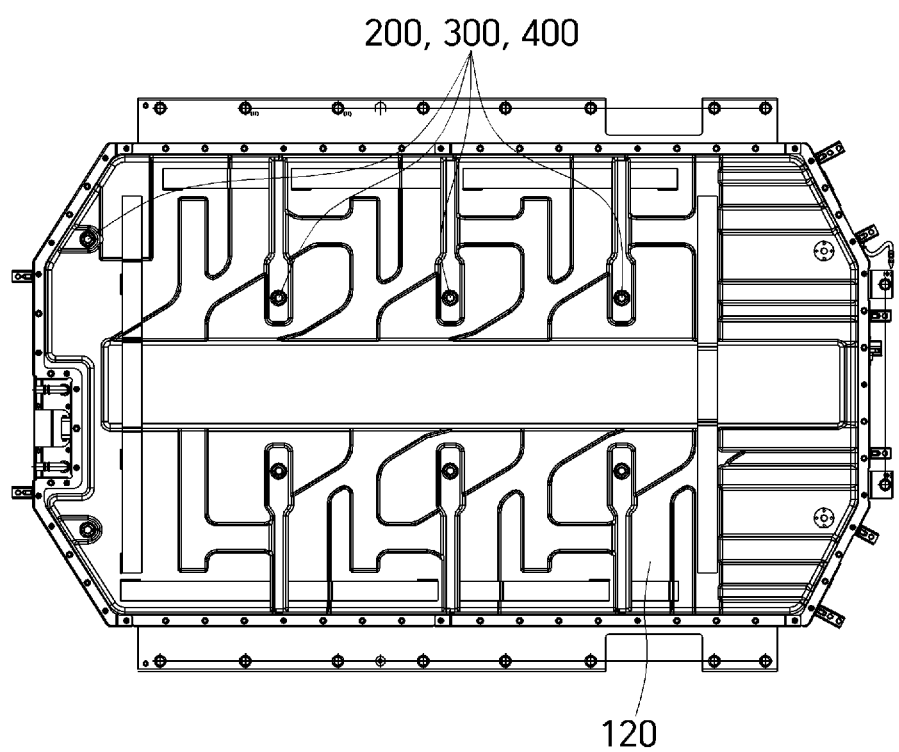
FIG. 2 is a plan view of an exemplary embodiment of a battery module for a vehicle constructed according to the principles of the invention.
Figure 3:
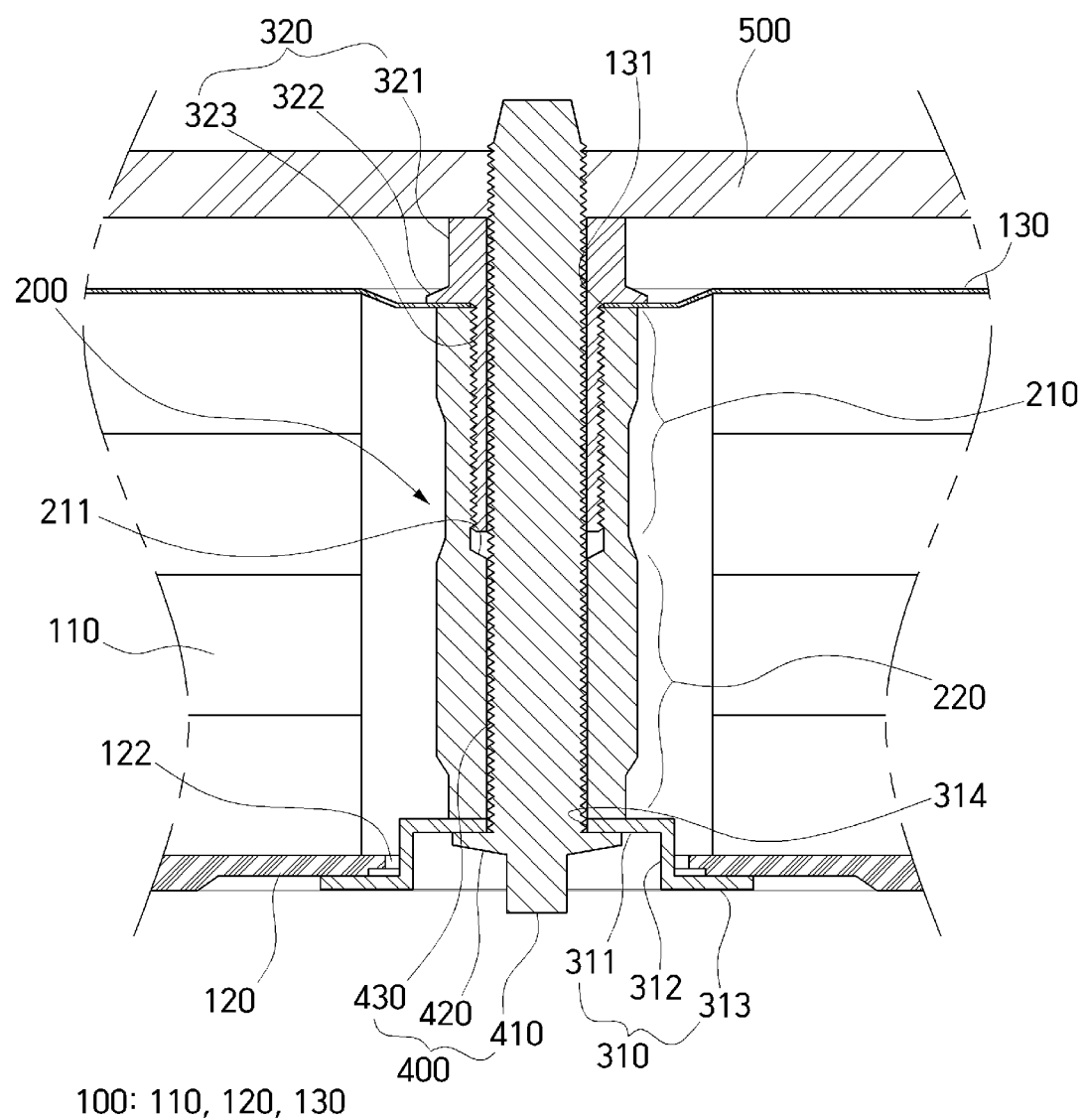
FIG. 3 is a cross-sectional view of the vehicle battery mount structure of FIG. 1 illustrating the battery module and the vehicle battery mount structure.
Figure 4:
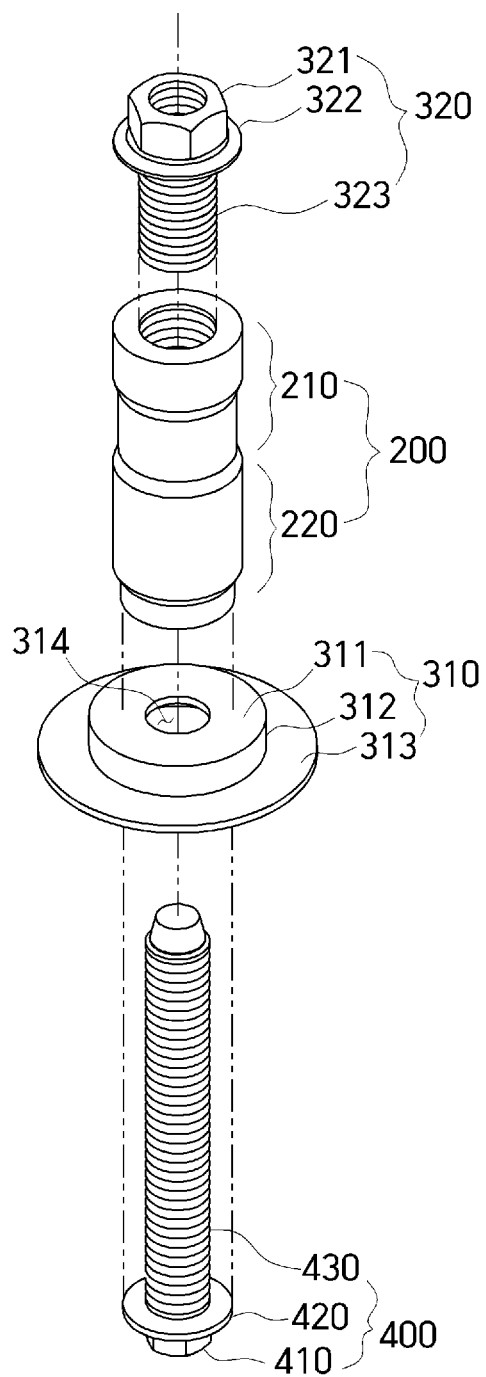
FIG. 4 is an exploded perspective view illustrating a state of the exploded vehicle battery mount structure of FIG. 1.

FIG. 1 is a perspective view of an exemplary embodiment of a configuration of a vehicle battery mount structure constructed according to the principles of the invention. FIG. 2 is a plan view of an exemplary embodiment of a vehicle battery module constructed according to the principles of the invention. FIG. 3 is a cross-sectional view of the vehicle battery mount structure of FIG. 1 illustrating the battery module and the vehicle battery mount structure. and FIG. 4 is an exploded perspective view showing a state of the exploded vehicle battery mount structure according to one embodiment of the present invention.

Referring to FIGS. 1, 2, 3, and 4, the vehicle battery mount structure includes a battery module 100, a through pipe 200, a fixing member 300, and a through bolt 400.

The battery module 100 is fixed to a vehicle body, specifically, to a lower surface of a vehicle body bottom frame and supplies power to a battery system.

The battery module 100 includes a battery cell 110, a lower case 120, and an upper case 130.

The battery cell 110 stores power which is supplied to the battery system.

In addition, the battery cell 110 is provided with a plurality of battery cells 110 and formed in a plate shape, and the plurality of battery cells 110 are vertically stacked.

However, exemplary embodiments are not limited thereto. For example, the battery cell 110 may be manufactured in one of various types, e.g., in a pouched type.

Since a flexible aluminum laminate sheet is used as an exterior member of the pouched type battery cell 110, the pouched type battery cell 110 is formed to be easily bent, and a lower end of the pouched type battery cell 110 is formed to have a curved surface.

Since a shape of the pouched type battery cell 110 formed is relatively freely formed and the pouched type battery cell 110 is light, the battery cell 110 is mainly used in the vehicle battery module 100 including the plurality of battery cells 110.

The lower case 120 forms a lower body of the battery module 100, the battery cell 110 is seated therein, and the lower case 120 is in contact with and fixed to the vehicle body.

Eight battery cells 110 may be disposed in the lower case 120 and spaced apart from each other by a distance.

However, exemplary embodiments are not limited thereto. For example, the number of the battery cells 110 may be varied, and be, e.g., eight or more or less.

In addition, first fixing holes 121, through which lower support members 310 pass, are formed in the lower case 120 between eight battery cells 110.

The upper case 130 forms an upper body of the battery module 100 and seals an upper portion of the lower case 120 in which the battery cell 110 is seated.

In addition, the upper case 130 is disposed on the lower surface of the vehicle body bottom frame.

In addition, in the upper case 130, second fixing holes 131, through which upper assembly bolts 320 pass, are formed at positions corresponding to the first fixing holes 121 formed in the lower case 120.

Referring to FIGS. 3 and 4, the through pipe 200 is formed in a hollow cylindrical shape, provided with a plurality of through pipes 200, and disposed between the upper case 130 and the lower case 120.

Specifically, some of the through pipes 200 are disposed between the plurality of battery cells 110 spaced apart from each other by the distance.

In addition, the remaining through pipes 200 are disposed in a side region of the battery module 100.

The through pipe 200 includes a first through portion 210 and a second through portion 220

The first through portion 210 is formed in a cylindrical shape, and an upper surface of the first through portion 210 is in contact with a lower surface of the upper case 130.

In addition, an upper assembly bolt 320 is coupled to the first through portion 210 in a screw-coupling method.

Accordingly, a screw thread is formed on an inner circumferential surface of the first through portion 210 to be coupled to the upper assembly bolt 320 in a screw-coupling method.

The second through portion 220 is formed in a cylindrical shape under the first through portion 210.

For example, the second through portion 220 extends downward from a lower end of the first through portion 210.

In addition, the through bolt 400 passes through the second through portion 220, and the second through portion 220 guides a passing direction of the through bolt 400.

For example, an inner diameter of the first through portion 210 is greater than an inner diameter of the second through portion 220.

A stepped portion 211 is formed between the first through portion 210 and the second through portion 220 in a direction toward a center of the through pipe 200.

Accordingly, when the upper assembly bolt 320 to be inserted into the first through portion 210 is excessively inserted into the first through portion 210, a lower end of the upper assembly bolt 320 comes into contact with the stepped portion 211.

For example, the stepped portion 211 may effectively prevent the upper assembly bolt 320 from being excessively inserted into the first through portion 210.

The fixing member 300 fixes the lower case 120 and the upper case 130 of the battery module 100 and includes a lower support member 310 and the upper assembly bolt 320.

The lower support member 310 is perched or disposed on a lower surface of the battery module 100 and is exposed to the outside of the battery module 100.

In addition, when the through bolt 400 is tightened by the upper assembly bolt 320, the lower support member 310 firmly supports the lower case 120.

For example, the through pipe 200, the lower support member 310, and the lower case 120 of the battery module 100 according to the exemplary embodiment are coupled in a welding method.

Accordingly, the through pipe 200, the lower support member 310, and the lower case 120 of the battery module 100 are formed in an integral type.

For example, since the through pipe 200, the lower support member 310, and the lower case 120 are formed in the integral type to simplify a structure thereof, space utilization in the battery module 100 can be maximized and, since the numbers of parts and assembly processes are decreased, working efficiency for fixing the battery module 100 to the vehicle body can be improved, and a cost can be reduced.

The lower support member 310 includes a bottom portion 311, a vertical portion 312, and a first flange part 313.

An upper surface of the bottom portion 311 is in contact with a lower surface of the second through portion 220, and the bottom portion 311 is formed in a disc shape.

In addition, the bottom portion 311 passes through the first fixing hole 121 of the lower case 120 to be positioned in the lower case 120.

A through hole 314, through which the through bolt 400 passes, is formed at a center of the bottom portion 311, and the through hole 314 is substantially concentric with the second through portion 220.

Accordingly, the through hole 314 guides the through bolt 400 to easily pass through the bottom portion 311.

The vertical portion 312 extends downward in a vertical direction (e.g., a thickness direction of the bottom portion 311 or the first flange part 313) along a circumference of the bottom portion 311.

An end portion, which is opposite to the bottom portion 311, of both end portions of the vertical portion 312 protrudes outward from the first fixing hole 121 of the lower case 120.

The first flange part 313 may be formed in a disc shape and extends in a horizontal direction from the end portion of the vertical portion 312.

In addition, the first flange part 313 is perched or disposed on a lower surface of the lower case 120 disposed in a lower portion of the battery module 100.

For example, the first flange part 313 is disposed outside the battery module 100 in a downward direction.

An outer diameter of the first flange part 313 is greater than an inner diameter of the first fixing hole 121.

Accordingly, the first flange part 313 may be effectively perched or fixed on the lower case 120 around the first fixing hole 121.

The upper assembly bolt 320 passes through the through pipe 200, specifically, the first through portion 210, and is perched or disposed on an upper surface of the battery module 100.

In addition, the upper assembly bolt 320 is coupled to the first through portion 210 in a screw-coupling method.

Accordingly, the upper assembly bolt 320 and the through pipe 200 may be firmly coupled to each other.

The upper assembly bolt 320 includes a first head portion 321, a second flange part 322, and a coupling part 323.

The first head portion 321 is formed in an upper portion of the upper assembly bolt 320 and protrudes outward from the upper case 130.

When the coupling part 323 is coupled to the first through portion 210 of the through pipe 200, the first head portion 321 include a portion to which a separate part is fitted.

The second flange part 322 may be formed in a disc shape and extends in a horizontal direction from a lower circumference of the first head portion 321.

In addition, the second flange part 322 is perched or disposed on an upper surface of the upper case 130 disposed in an upper portion of the battery module 100.

For example, the second flange part 322 is positioned outside the battery module 100 in an upward direction.

An outer diameter of the second flange part 322 is greater than an inner diameter of the second fixing hole 131.

Accordingly, the second flange part 322 may be effectively perched or fixed on the upper case 130 around the second fixing hole 131.

An outer circumferential surface of the coupling part 323 is coupled to the first through portion 210 in a screw-coupling method.

Accordingly, a screw thread corresponding to the screw thread of the first through portion 210 is formed on the outer circumferential surface of the coupling part 323.

For example, an outer diameter of the coupling part 323 may be equal to the inner diameter of the first through portion 210.

For example, an inner diameter of the upper assembly bolt 320 may be equal to the inner diameter of the second through portion 220.

Accordingly, when the through bolt 400 passes through the through hole 314 of the lower support member 310 to be inserted into the second through portion 220 and an inside of the upper assembly bolt 320, the through bolt 400 may be guided in a moving direction without being shaken.

The through bolt 400 fixes the battery module 100 to the vehicle body bottom frame and passes through the lower support member 310, the through pipe 200, and the upper assembly bolt 320.

In addition, the through bolt 400 is perched or disposed on a lower surface of the bottom portion 311 of the lower support member 310.

The through bolt 400 includes a second head portion 410, a third flange part 420, and a screw part 430.

The second head portion 410 is formed in a lower portion of the through bolt 400 and include a portion to which a separate part is fitted when the screw part 430 is coupled to the vehicle body bottom frame.

The third flange part 420 may be formed in a disc shape and extends from a lower circumference of the second head portion 410 in a horizontal direction.

In addition, the third flange part 420 is perched or disposed on the lower surface of the bottom portion 311 of the lower support member 310.

For example, the third flange part 420 is disposed outside the lower support member 310 in a downward direction (e.g., in a vertically downward direction).

An outer diameter of the third flange part 420 is greater than an inner diameter of the through hole 314 of the lower support member 310.

Accordingly, the third flange part 420 may be effectively perched or fixed on a bottom portion 311 of the lower support member 310 around the through hole 314.

A screw thread is formed on an outer circumferential surface of the screw part 430, and the screw part 430 extends from an upper surface of the third flange part 420 in a direction toward the coupling part 323 of the upper assembly bolt 320.

In addition, the screw part 430 passes through the lower support member 310, the through pipe 200, and the upper assembly bolt 320.

For example, a length of the screw part 430 is greater than the sum of a length of the through pipe 200 and a length of the first head portion 321 protruding from the and upper case 130.

Accordingly, when the screw part 430 passes through the lower support member 310, the through pipe 200, and the upper assembly bolt 320, an end portion of the screw part 430 protrudes outward from the first head portion 321.

The end portion of the screw part 430 protruding outward from the first head portion 321 is fixed to the vehicle body bottom frame.

Accordingly, since the third flange of the through bolt 400 supports the lower support member 310 supporting the lower case 120, and the end portion of the screw part 430 is fixed to the bottom frame of the vehicle, the battery module 100 may be easily fixed to the vehicle body bottom frame.

For example, when the through bolt 400 fixes the battery module 100 to the vehicle body, the through bolt 400 passes through the battery module 100 and is fixed to a vehicle body bottom frame 500, and thus a fixing force of the battery module 100 can be secured.

For example, an outer diameter of the screw part 430 is greater than or equal to the inner diameter of the second through portion 220 and an inner diameter of the coupling part 323.

Accordingly, when the screw part 430 passes through the second through portion 220 and the coupling part 323, the screw part 430 may easily pass therethrough.

Hereinafter, an assembly process for the vehicle battery mount structure according to the exemplary embodiment formed as described above will be described in detail with reference to the accompanying drawings.

FIGS. 5A, 5B, 5C, 5D, and FIG. 5E are sequential assembly views illustrating an exemplary embodiment of an assembly sequence of the vehicle battery mount structure according to the principles of the invention.

Figure 5A:
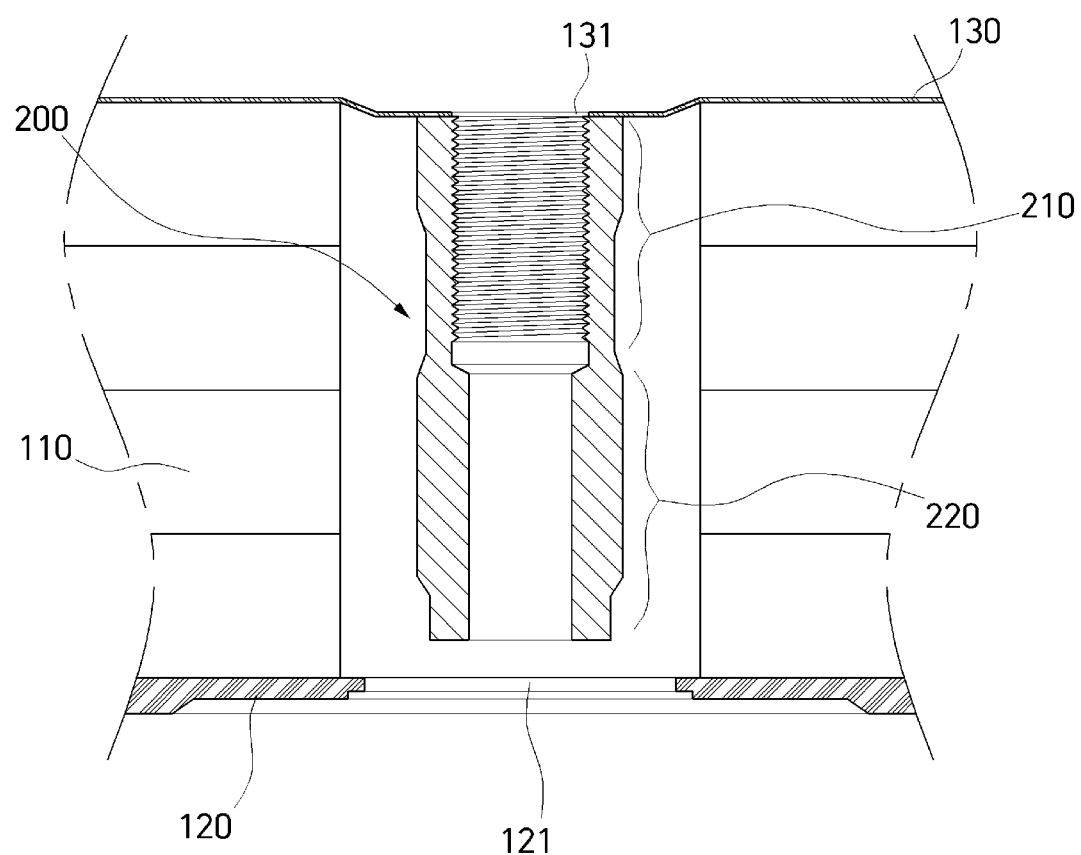
FIGS. 5A, 5B, 5C, 5D, and FIG. 5E are sequential assembly views illustrating an exemplary embodiment of an assembly sequence of the vehicle battery mount structure according to the principles of the invention.

First, as illustrated in FIG. 5A, the through pipe 200 is disposed between the upper case 130 and the lower case 120 of the battery module 100.

In this case, an upper surface of the through pipe 200 is in contact with the lower surface of the upper case 130.

In addition, the through pipe 200 is disposed to be substantially concentric with the second fixing hole 131 formed in the upper case 130 and the first fixing hole 121 formed in the lower case 120 when viewed from above.

Figure 5B:
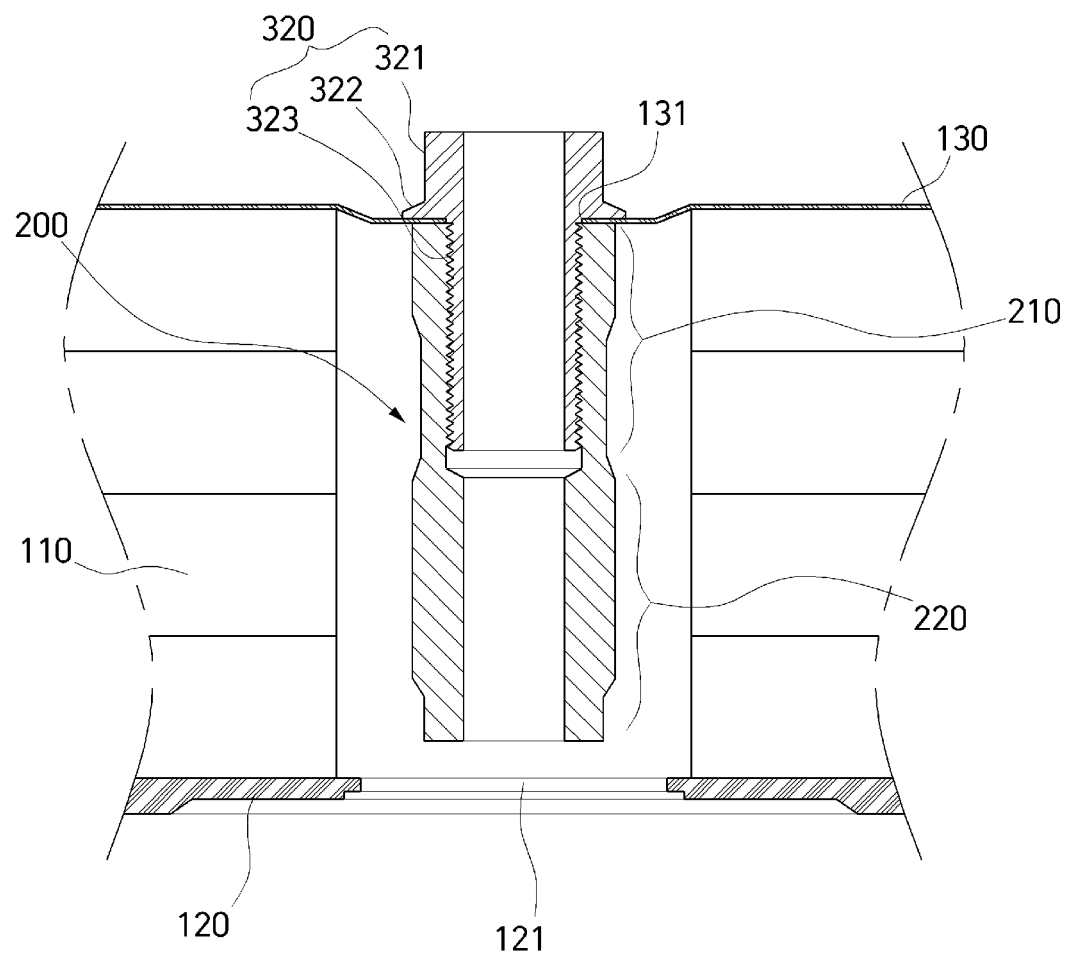

Then, as illustrated in FIG. 5B, the upper assembly bolt 320 passes through the second fixing hole 131 of the upper case 130 to be inserted between the inner circumferential surface of the first through portion 210.

The upper assembly bolt 320 is coupled to the first through portion 210 in a screw-coupling method.

Figure 5C:
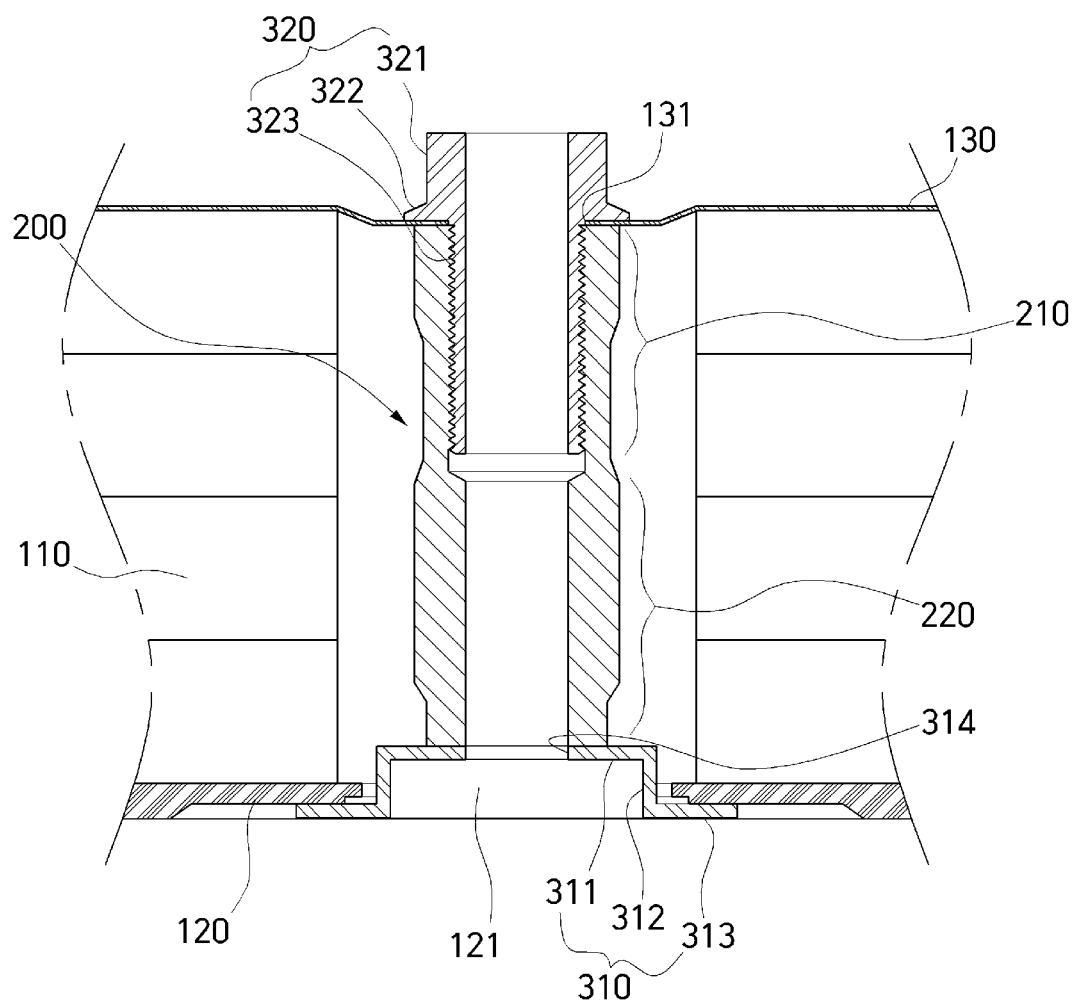

In addition, as illustrated in FIG. 5C, the lower support member 310 is disposed below the second through portion 220 of the through pipe 200 such that the upper surface of the bottom portion 311 of the lower support member 310 is into contact with the lower surface of the second through portion 220 of the through pipe 200.

In this case, the bottom portion 311 of the lower support member 310 passes through the first fixing hole 121.

In addition, the first flange part 313 of the lower support member 310 comes into contact with the lower surface of the lower case 120.

Accordingly, the lower support member 310 may firmly support the lower case 120.

In this case, the lower case 120, the lower support member 310, and the through pipe 200 are integrally formed in a welding method.

For example, since the numbers of parts and assembly processes are decreased, working efficiency for fixing the battery module 100 to the vehicle body is improved and a cost can be reduced.

Figure 5D:
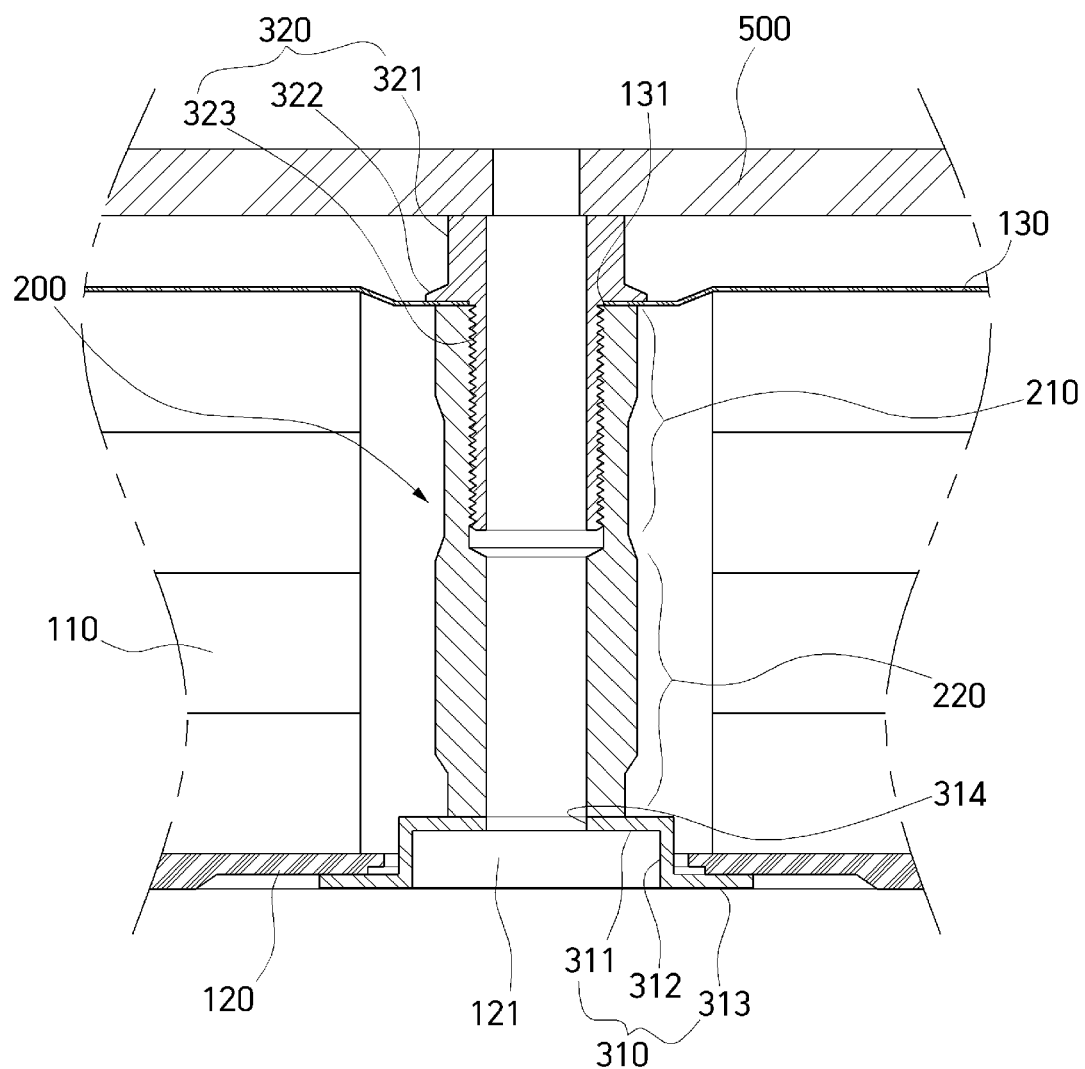

In addition, as illustrated in FIG. 5D, the battery module 100, the through pipe 200, the upper assembly bolt 320, and the lower support member 310 are disposed under the vehicle body bottom frame 500.

In this case, the upper surface of the first head portion 321 of the upper assembly bolt 320 is in contact with the lower surface of the vehicle body bottom frame 500.

Figure 5E:
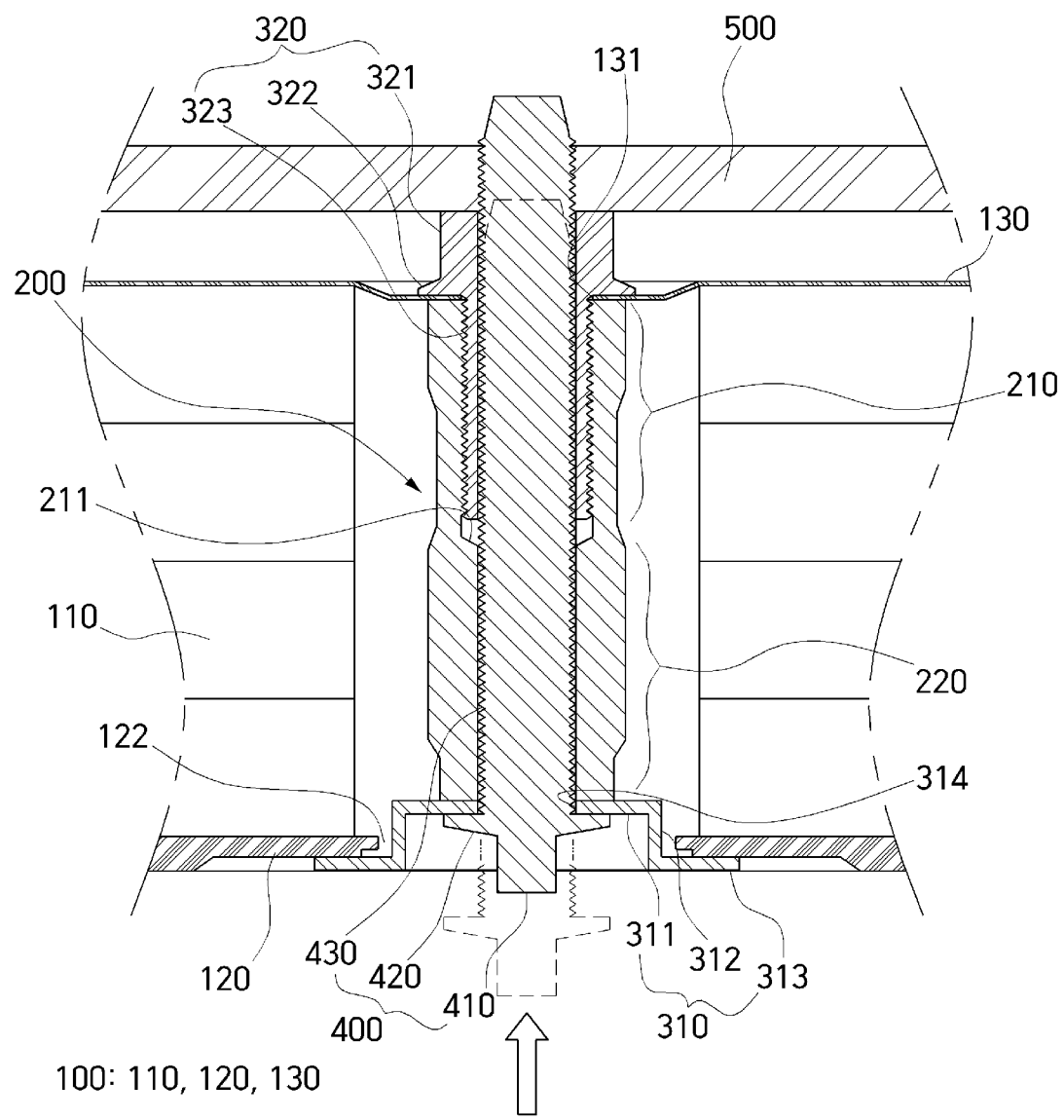

Then, as illustrated in FIG. 5E, when the through bolt 400 passes through the lower support member 310, the through pipe 200, and the upper assembly bolt 320, the screw part 430 of the through bolt 400 protrudes outward from the first head portion 321 of the upper assembly bolt 320.

The end portion, which protrudes outward from the first head portion 321, of the screw part 430 is fixed to the vehicle body bottom frame 500.

In addition, as the through bolt 400 is tightened, the bottom portion 311 supported by the third flange part 420 of the through bolt 400 is pressed in an upward direction (e.g., in a vertically upward direction), and thus the first flange part 313 presses the lower case 120 in an upward direction.

In addition, the through pipe 200 pressed against the upper surface of the bottom portion 311 presses the upper case 130 in the upward direction, and the upper case 130 presses the second flange part 322 in the upward direction.

Accordingly, the upper surface of the first head portion 321 is pressed against the lower surface of the vehicle body bottom frame 500.

For example, the battery module 100 may be firmly fixed to the vehicle body bottom frame 500 by tightening the through bolt 400.

For example, the upper surface of the first through portion 210 is in contact with the lower surface of the upper case 130, and the lower surface of the second through portion 220 is in contact with an upper surface of the lower support member 310 supporting the lower case 120.

For example, the upper case 130 and the lower frame may be effectively or substantially prevented from being excessively pressed against each other due to tightening of the screw part 430 and the vehicle body bottom frame 500.

Accordingly, the battery cell 110 seated on the lower case 120 can be effectively or substantially prevented from being damaged due to an excessive pressure between the lower case 120 and the upper case 130.

In a vehicle battery mount structure according to an exemplary embodiment, since a through pipe, a lower support member, and a lower case of a battery module are formed in an integral type, a structure of the through pipe, the lower support member, and the lower case is simplified, space utilization in the battery module can be maximized, the numbers of parts and assembly processes are decreased, and thus there are effects in that working efficiency for fixing the battery module to a vehicle body can be improved and a cost can be reduced.

In addition, since an end portion of a screw part of a through bolt protruding outward from the upper assembly bolt is fixed to a vehicle body bottom frame, a third flange supports the lower support member supporting the lower case, and since the end portion of the screw part is fixed to the bottom frame of a vehicle, the battery module can be easily fixed to the vehicle body bottom frame, and when the battery module is fixed to the vehicle body, since the through bolt passes through the battery module and is fixed to the vehicle body bottom frame, there is an effect in that a fixing force of the battery module can be secured.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A vehicle battery mount structure comprising:
a battery module fixed to a vehicle body;
a through pipe disposed in the battery module;
a fixing member configured to fix a lower case and an upper case of the battery module; and
a through bolt configured to fix the battery module to a vehicle body bottom frame,
wherein the through bolt passes through the through pipe and the fixing member and is coupled to the fixing member,
wherein the battery module comprises:
a plurality of battery cells configured to store power to be supplied to a battery system;
the lower case supporting the plurality of battery cells and comprising a first fixing hole, through which the fixing member passes; and
the upper case coupled to an upper portion of the lower case and comprising a second fixing hole, through which the fixing member passes, is formed,
wherein the fixing member comprises:
a lower support member passing through the first fixing hole and disposed on a lower surface of the lower case; and
an upper assembly bolt passing through the second fixing hole and disposed on an upper surface of the upper case.

2. The vehicle battery mount structure of claim 1, wherein the lower case is integrally formed with the through pipe and the lower support member.

3. The vehicle battery mount structure of claim 1, wherein the through pipe comprises:
a first through portion comprising an upper surface contacting a lower surface of the upper case, the first through portion coupled to the upper assembly bolt in a screw-coupling method; and
a second through portion disposed below the first through portion,
wherein the through bolt passes through the second through portion.

4. The vehicle battery mount structure of claim 3, wherein an inner diameter of the upper assembly bolt is substantially equal to an inner diameter of the second through portion.

5. The vehicle battery mount structure of claim 3, wherein an inner diameter of the first through portion is greater than an inner diameter of the second through portion.

6. The vehicle battery mount structure of claim 3, wherein the lower support member comprises:
a bottom portion comprising an upper surface contacting a lower surface of the second through portion;
a vertical portion vertically extending along a circumference of the bottom portion; and
a first flange part horizontally extending from an end portion of the vertical portion and comprising an upper surface disposed on a lower surface of the lower case.

7. The vehicle battery mount structure of claim 6, wherein the upper assembly bolt comprises:
a second flange part comprising a lower surface disposed on an upper surface of the upper case; and
a coupling part comprising an outer circumferential surface coupled to the first through portion of the through pipe in a screw-coupling method and an inner circumferential surface along which the through bolt passes through.

8. The vehicle battery mount structure of claim 7, wherein the through bolt comprises:
a third flange part comprising an upper surface disposed on the bottom portion of the lower support member; and
a screw part extending in a direction from the third flange part toward the coupling part and coupled to the coupling part.

* * * * *